United States Patent [19]

Tokumaru

[11] Patent Number: 4,798,453

[45] Date of Patent: Jan. 17, 1989

[54] EYEGLASS FRAME AND PROCESS FOR INJECTION MOLDING SAME

[75] Inventor: Kaoru Tokumaru, Fukui, Japan

[73] Assignee: Yugen Kaisha Tokumaru Kogyo, Sakai, Japan

[21] Appl. No.: 124,085

[22] Filed: Nov. 23, 1987

[30] Foreign Application Priority Data

Aug. 21, 1987 [JP] Japan .................................. 62-207478

[51] Int. Cl.⁴ .............................................. C02C 11/02
[52] U.S. Cl. .......................................... 351/41; 351/51
[58] Field of Search ...................... 351/51, 52, 41, 111, 351/124, 154, 158

[56] References Cited

U.S. PATENT DOCUMENTS 4,494,833  1/1985  Takamura et al. ..................... 351/41

*Primary Examiner*—Rodney B. Bovernick
*Attorney, Agent, or Firm*—Sixbey, Friedman, Leedom & Ferguson

[57] ABSTRACT

The frame of eyeglasses is produced by injection molding of a synthetic resin whose principle material is a polyarylate resin, a decorative coating layer on part or over the entire portion of the surface of the frame of eyeglasses, and a coating film is heat-hardened together with the frame of eyeglasses at about 130° to 150° C.

24 Claims, No Drawings

EYEGLASS FRAME AND PROCESS FOR INJECTION MOLDING SAME

FIELD OF THE INVENTION

The present invention relates to a frame of eyeglasses, which is produced from a synthetic resin injection molded.

BACKGROUND OF THE INVENTION

It is conventionally known that frames of eyeglasses are produced from metals and synthetic resins. The latter has more advantages than the former in light weight and decoration.

The known frames of eyeglasses, which are produced from synthetic resin, have been conventionally produced by cutting and scraping a plate or sheet composed of fiber resins such as celluloid, cellulose acetate plastics, etc., forming a piece of frame, and flexing it. However, a high cost problem is caused by the production of such frames of eyeglasses since the aforesaid plate and sheet are expensive. Also, the production of individual frames of eyeglasses involving complicated operations is not suitable for mass production, which will cause another high cost problem. Furthermore, they are easily deformed or deteriorated by heat or humidity due to their poor physical properties, and there is the problem that the variation with time shortens their life cycle.

Therefore, a frame of eyeglasses comprising injection-molding of a synthetic resin is provided in recent years, being known to the public. This frame of eyeglasses employs a carbon-reinforced thermoplastic synthetic resin as a principle material, having better physical properties than the frame of eyeglasses made from the aforesaid plate or sheet of celluloid or cellulose acetate plastics in chemical and heat resistances. Using an injection molding machine facilitates mass production, leading to production at a relatively low cost. However, the frame of eyeglasses made from a carbon-reinforced resin short fiber as described above has low resistance to flexure, and therefore, there is the problem of being easily snapped when bent and deformed.

And, since the raw material is blackened with the carbon short fiber, there is the problem of limiting the expression of a desired color. Even though a decorative effect is expected to be obtained by forming a decorative coating layer on the black surface of the frame of eyeglasses, the black colored resin skin of the frame of eyeglasses prevents a light-colored decorative coating layer from exhibiting a brilliant color tone as expected, and all frames of eyeglasses which are made from carbon-short-fiber-reinforced resins have been therefore marketed with their naked black skin color remaining.

Moreover, in forming a decorative coating layer on the surface of the frame of eyeglasses which is made from carbon-short-fiber-reinforced resins, anti-stress-cracking qualities and peeling resistance need to be reinforced by having said coating layer thermoset. However, if nylon (polyamide) for example is employed as the synthetic resin to be reinforced with carbon short fiber which will be a raw material of the frame of eyeglasses, the decorative coating layer on the surface of the frame of eyeglasses cannot be solidified with heat since the heat resistance temperature of the nylon is at approximately 140° C. or more, if it has been injection-molded. This gives rise to the problem of the deformation of the frame itself of eyeglasses if it is subjected to a high temperature for the solidification of the frame of eyeglasses.

Even if an attempt is made to seek a synthetic resin suitable for the injection molding of a frame of eyeglasses, for example, a polycarbonate regarded as an engineering plastic in these years, since the heat deformation temperature is at 120° to 140° C., there is a problem, similarly to the afore-description, that it is impossible to apply a decorative coating layer to be heat-hardened at a high temperature over the surface of injection molded frame of eyeglasses.

SUMMARY OF THE INVENTION

This invention is to provide a frame of eyeglasses, which have been able to solve every problem as described before.

That is to say, this invention has determined that it is most advantageous to make the injection molding of a frame of eyeglasses by employing polyarylate resins, and examining various synthetic resins in pursuit of such as to be free of the reinforcement of a carbon short fiber, to possess enough physical properties and to be resistive to a high temperature.

Also the frame of eyeglasses of the invention is characterized as being injection molded by employing a synthetic resin whose principle material is polyarylate resin. This frame of eyeglasses is superior to one made from a resin reinforced with carbon-short-fiber from the standpoint of compressibility, tensile strength, and flexing properties.

In one preferred example of this invention, the frame of eyeglasses forms a decorative coating layer heat-treated on part or the entire portion of the frame surface of eyeglasses obtained by means of the injection molding of natural pellets of a polyarylate resin. The decorative coating layer forms, for example, a metallic deposit applied over the entire frame surface of eyeglasses, the base coating layer applied over the entire surface of said metallic deposit and composed of a heat-reinforced paint, and a spotty-formed coating layer comprised of a paint applied in a spotty form and heat-hardened onto said base coating layer. Since a frame of eyeglasses made from the polyarylate is excellent in electrical conductivity, the aforesaid metallic deposit can be adequately formed by electroplating nickel. A clear color made by including a dyestuff in a baked acrylic clear resin may be used as the aforesaid paint forming a base coating layer. A paint gelled by the stirring of a sublimating dyestuff and pearl powder with alcohol may be used as the aforesaid paint forming a top coating layer. Both the base and top coating layers are heat-hardened at 130° to 150° C., which will not allow the frame of eyeglasses made from a polyarylate resin to deform when heated.

In another preferred embodiment of the invention, the frame of eyeglasses has a heat-treated decorative coating layer formed on part or over the entire portion of the surface of the frame of eyeglasses, which is obtained by the injection molding of a resin material comprised of adding a small amount of colored polyethylene terephthalate resin with polyarylate resin pellets. The decorative coating layer forms, for example, the spotty-formed base coating layer composed of a paint applied in a spotty-form to the frame surface of eyeglasses, and the top coating layer composed of a paint additionally applied over the entire surface of eyeglasses frame having said base coating layer thereon. As each of the paints forms the base coating layer and top coating layer, it is possible to use the baking acrylic paint included with a pearl pigment. Each of the base coating layer and top coating layer is heat-hardened at 150° C., which will not cause the heat deformation of the frame of eyeglasses made from a polyarylate resin to occur when heated.

EMBODIMENT

A polyarylate resin, which is employed for the frame of eyeglasses as its principle material, is represented by the following chemical constitution formula:

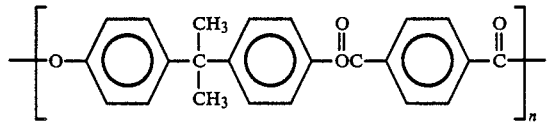

The polyarylate resin is offered by DuPont under the commercial name of "Arylon", having a great dimensional resistance since it is a thermoplastic non-crystalline resin with low mold shrinkage and water absorption as compared with a crystalline resin. Also, its heat deformation temperature is considerably high at about 177° C. (4.6 kg/cm$^2$), its mechanical properties are maintained even at an elevated temperature, and it is excellent in resistance to heat. The polyarylate resin has a great resistance to ultraviolet rays, its mechanical properties being scarcely changed even after being subjected to solar rays for a long time, and being excellent in weatherability. Its chemical resistance is also great as compared with other noncrystalline plastics. Moreover, it has characteristic properties, such as a great impact strength, excellent toughness, and it will not lose its toughness even over a wide range of environmental temperatures, for example, at a range from −40° C. to +120° C.

Description is made of the embodiment as follows:

EMBODIMENT 1

The admixture of 100 transparent polyarylate resin pellets with 5 red resin pellets, which are produced by coloring using a pigment in thermoplastic resin pellets (for example, polyethylene terephthalates) having a good blend with polyarylate, is made, this admixture is injected into the dies by an injection molding machine at a resin melt temperature of 300° to 310° C., and thereby a frame of eyeglasses is formed. The bare skin of the frame of eyeglasses exhibits a pattern of streamlined stripe by admixing transparent and red resin raw materials. Using a cutter, flash and parting line on the frame of eyeglasses are removed therefrom.

Secondly, the aforesaid formed surface of the frame of eyeglasses is applied, in a spotty pattern, with a baking acrylic paint included with pearl pigments, and it is naturally dried for 10 to 20 minutes to form a base coating layer that becomes a spotty pattern.

Then, the entire surface of the frame of eyeglasses is similarly applied with the aforesaid baking acrylic paint in a manner of superimposing the application of a paint over the aforesaid base coating layer thereon, and it is naturally dried for 10 to 20 minutes to form a top coating layer.

Afterward, the frame of eyeglasses is placed within a warm-air blowing dryer to be subjected to the warm air of about 150° C. for about 30 minutes, and the aforesaid base and top coating layers are thereby hardened.

During and after the heat treatment, no heat deformation of the frame of eyeglasses was observed.

The frame of eyeglasses obtained by means of the Embodiment 1 has a beautifully deepened tone of color with spotty patterned pearl gloss in harmony with a red marble tone which the resin material provides.

EMBODIMENT 2

Polyarylate resin natural pellets are injected by an injection molding machine into the dies at a resin melt temperature of 300° to 310° C. to form the frame of eyeglasses.

Using sandpaper, flash and parting line are removed from the frame of eyeglasses.

Soon after this, using an electroplating device, the entire surface of the aforesaid formed frame of eyeglasses is nickel-plated to form a metallic deposit thereon. The most excellent electrical conductivity of the frame of eyeglasses enables the nickel deposit to be instantly adhered, showing the most satisfactory adherence of metallic deposit.

Secondly, the entire surface of the aforesaid metallic deposit is applied with a clear color prepared by including a brown dyestuff in a baking acrylic clear resin being naturally dried for 10 to 15 minutes to form a base coating layer thereon. The frame of eyeglasses is then placed within an oven to be heated at about 130° C. for about 10 minutes to solidify the base coating layer.

Furthermore, after naturally cooling the frame of eyeglasses, the entire surface of the aforesaid base coating layer is applied with the baking acrylic clear resin similar to the aforesaid one, being naturally dried for 10 to 15 minutes to build a secondary coating layer. After that, the frame of eyeglasses is placed within an oven to be heated at about 150° C. for about 20 minutes to harden the secondary coating layer. During and after this heat treatment, no heat deformation of the frame of eyeglasses was observed.

Furthermore, after the frame of eyeglasses is naturally cooled, the surface of said secondary coating layer is applied in a spotty form with a gel-formed paint prepared by mixing a sublimating dyestuff and pearl powder with alcohol, being naturally dried for about 20 minutes to form a spotty-formed top coating layer. Then, after the frame of eyeglasses is naturally cooled, by cleaning the surface of the frame of eyeglasses, non-sublimated dyestuff and pearl power are removed therefrom. During and after the aforesaid heat treatment, no heat deformation of the frame of eyeglasses was observed.

The frame of eyeglasses, obtained by means of Embodiment 2, has a metallic deposit luster of its bare skin, exhibiting the texture similar to that of a metallic frame of eyeglasses, and on the metallic deposit, a graceful pattern providing harmony between the brown-colored base coating layer and the spotty-formed top coating layer appears.

Physical properties of the frame of eyeglasses as described in Embodiment 1 (called Product A) and that as described in Embodiment 2 (called Product B) were tested to compare with a frame of eyeglasses (called Product C), which is produced by including a carbon short fiber in nylon 66, injection-molded and commercially provided on the market. In this connection, all of Products A, B and C were put under the same testing condition with regard to form and dimension of every constituent part.

TEST 1

Compressive Test

The frame of eyeglasses is fixed on the test table, and using a cross head, a load is applied to the upper frame part of the left eye (a part positioned above the eye when wearing), then the load, which deformed said upper frame part until it reached 8 mm (the amount of movement of a cross head) was measured. The cross head speed was at 200 mm/min., and the compression was carried out 10 times per test. This test was carried out 3 times, and Table 1 shows the average values:

TABLE 1

|  | Product A | Product B | Product C |
| --- | --- | --- | --- |
| Unit: Kg | 2.3 | 2.4 | 3.6 |

Note:
Materials of Products A and B are found to be flexible in contrast to the rigid material of Product C. It was visually observed that, during the test, Products A and B rapidly restored to normal conditions after the compression while Product C restored slowly. Also, the upper frame of Product C was fractured when the 3rd test was carried out.

TEST 2

Tensile Strength Test

A screw was removed from "armor part" of a frame of eyeglasses (a protruded end of an upper frame for use in the connection of a loop-formed end of the frame), said frame of eyeglasses was fixed upsidedown on the fixed table with said armor part being kept opened, a pin at the end of the cross head was hung against the loop frame of the left eye part, which was pulled upwardly using the pin, and the tensile strength exerted for causing the frame deformation up to 30 mm was measured. The cross head speed was 50 mm/min., the pulling test was performed one time per test, the test was carried out 3 times, and the average values are shown in Table 2.

TABLE 2

|  | Product A | Product B | Product C |
| --- | --- | --- | --- |
| Unit: g | 306 | 360 | 513 |

Note:
Materials of Products A and B are found to be flexible in contrast to the rigid material of Product C. It was visually recognized that, during the test, while Product C did not restore to its original position after being pulled out one time, Products A and B did not show such phenomena besides restoring to normal conditions even after being pulled.

TEST 3

Compressive and Fracture tests

Similarly, as in Test 1, a frame of eyeglasses was placed on the fixed table, a cross head was used to apply a load to the upper frame of the right eye part, the cross head was moved until said upper frame was fractured, and the deformation amount of the frame (the movement of the cross head) at this time was measured. The cross head speed was 50 mm/min., using 3 specimens for each of Products A, B and C, each test was carried out 3 times, and the average values as a result are shown in Table 3.

TABLE 3

|  | Product A | Product B | Product C |
| --- | --- | --- | --- |
| Unit: mm | 37 | 28 | 15 |

Note:
Material of Products A and B are found to be flexible in contrast to the rigid material of Product C. Product A was deformed up to the amount of 34 mm either at 1st and 2nd tests; however, it could not be deformed until it was fractured because the cross head slipped down from the upper frame part. In testing the 3rd specimen of Product A, it was fractured when deformed up to the amount of 44 mm. The value shown in Table 3 with respect to Product A is the average one of the deformation amounts of those 3 specimens. The fractured position was all the same for those 3 specimens of Product B (part held over the nose when wearing), while it was the upper frame part with regard to all 3 specimens of Product C.

TEST 4

Flexture Test

A screw was removed from "armor part" of a frame of eyeglasses (an extruded end of the upper frame for use in the connection of the frame loop-formed end), the loop frame of the right eye part was made to flex by gripping with the fingers, with the armor port being kept opened. The loop part of Product C was bent and fractured when bent to an angle of about 90°. By contrast, both Products A and B were not fractured even when bent to an angle of about 150°.

It is not intended to have this invention limited to the embodiment as described above, and various modifications may be made without departing from the technological idea as described in what is claimed. In injection molding a frame of eyeglasses, it is possible to use, for example, a resin raw material of 100% polyarylate resin as described in Embodiment 2 as well as a resin material which is an admixture of polyarylate resin and any other resin having a good blend with it as described in Embodiment 1, and in this case, a colored resin can be used as a resin to be added. To put it briefly, in this invention, it is acceptable if a resin raw material forming a frame of eyeglasses is one whose principle material is a polyarylate resin.

And, a frame fabricated by injection-molding a resin whose principle material is a polyarylate resin may be used as a frame of eyeglasses without a decorative coating layer formed thereon and as it is, and it is also possible to form a suitable decorative coating layer thereon as described in Embodiment 1 and 2. With regard to a raw material forming the decorative coating layer, it can be formed by selecting and combining those shown in the aforesaid Embodiment 1 and 2, or a variety other than it can be used, and as means for forming the coating layer, the painting method in accordance with a spraying technique or any other various methods can be employed. Furthermore, a laminate such as a coating film layer or a metallic deposit layer is available to apply as a coating layer, or composite layer with metallic deposit layers as described in Embodiment 2 is also available. For the formation of such metallic film layer, it is preferable to arrange not to damage the electrical conductivity by fabricating a frame of eyeglasses with 100% polyarylate resin; however, in the case of forming only the coating film layer on a frame of eyeglasses without the formation of a metallic deposit layer, it is sufficient if the frame is fabricated with a material whose principle material is a polyarylate resin. And furthermore, a coating layer may be formed by laminating the coating film layers themselves to form a plurality of layers, and in this case, it is sufficient, if, in a coating layer over the entire surface and a spotty-formed coating layer, one is arranged to be a lower layer and the other is arranged to be an upper layer, which means that there is no definition as to the upper and lower relations of the layers.

EFFECT OF THE INVENTION

A frame of eyeglasses of the invention, which is suitable for the easy mass production by means of injection molding, has excellent properties in dimensional resistance, heat resistance, weatherability, chemical resistance and toughness which a polyarylate resin provides, and is particularly superior to a conventional breakable frame of eyeglass made from a carbon-short-fiber-reinforced resin in physical properties such as compressibility, tensile strength, and flexture, as apparent from the aforesaid testing.

And, since the frame is a injection-molded article employing a polyarylate resin as its principle material, being transparent or semitransparent, part of the entire portion of the surface is easily colored brightly and colorfully by means of a decorative coating layer, and an excellent frame of eyeglasses may be offered from the decorative point of view.

Particularly, since a frame of glasses, which is made from a polyarylate resin having a greater heat resistance than other resins, is not heat-deformed even if heated to a considerably elevated temperature, for example, to about 150° C., it is possible to bake and harden a decorative coating layer by means of heat-treatment at such a considerably elevated temperature, making said coating layer to be a tough and hard film, and realizing the formation of a practical decorative coating layer, which greatly provides a practical benefit.

What is claimed is:

1. An eyeglass frame comprised of an injection molded synthetic resin whose principal material is polyarylate resin.

2. An eyeglass frame as set forth in claim 1, wherein a heat-treated decorative coating is formed on at least a portion of a surface of the molded synthetic resin.

3. An eyeglass frame as set forth in claim 2, wherein the decorative coating is formed of a metallic deposit layer extending over the entire surface of the frame, a base coating layer comprised of a paint applied and heat-hardened over the entire surface of said metallic deposit layer, a secondary coating layer comprised of a paint applied and heat-hardened over the entire surface of said base coating layer, and a spotty-formed top coating layer comprised of a paint applied in spotty form and heat-hardened over said secondary coating layer.

4. An eyeglass frame as set forth in claim 3, wherein the metallic deposit layer is composed of nickel, the paint of the base and secondary coating layers is composed of a clear color prepared by including a dyestuff in a baking acrylic clear resin, and a dyestuff forming the top coating layer is composed of a paint prepared by stirring a sublimating dyestuff and pearl powder with alcohol into a gel state.

5. An eyeglass frame as set forth in claim 2, wherein the decorative coating is a composite composed of base and top coating layers, one of said coating layers being a spotty-formed coating layer composed of a paint applied on a surface of the frame in a spot form, the other layer being a coating layer composed of paint applied over the entire surface of the frame of eyeglasses, and both of the coating layers being heat-hardened.

6. An eyeglass frame as set forth in claim 5, wherein the paints forming the base and top coating layers are composed of a baking acrylic paint including a pearl pigment.

7. An eyeglass frame manufactured by a process of injection-molding using a synthetic resin whose principal material is polyarylate, and, subsequently, forming a decorative layer on at least part of a surface of said frame and then heat-hardening said decorative coating layer together with said frame at a temperature of about 130° to 150° C.

8. An eyeglass frame as set forth in claim 1, wherein the injection molded parts of the eyeglass frame are formed of colored polyethylene terephthalate admixed with said polyarylate resin.

9. An eyeglass frame as set forth in claim 8, wherein a heat-treated decorative coating is formed on at least a portion of a surface of the molded synthetic resin.

10. An eyeglass frame as set forth in claim 9, wherein the decorative coating is a composite composed of base and top coating layers, one of said coating layers being a spotty-formed coating layer composed of a paint applied on a surface of the frame in a spot form, the other layer being a coating layer composed of paint applied over the entire surface of the frame, and both of the coating layers being heat-hardened.

11. An eyeglass frame as set forth in claim 10, wherein the paints forming the base and top coating layers are composed of a baking acrylic paint including a pearl pigment.

12. A process for injection molding an eyeglass frame comprising the steps of:
(A) producing a resin melt of a synthetic resin whose principal material is polyarylate resin;
(B) injecting the resin melt into eyeglass frame forming dies of an injection molding machine at a temperature of 300° to 310°·C.;
(C) removing an eyeglass frame from the dies; and
(D) removing any flash and parting line from the eyeglass frame.

13. A process according to claim 12, wherein said resin melt is formed from natural polyarylate resin pellets.

14. A process according to claim 13, comprising the further step of applying a heat-treated decorative coating over at least a portion of the injection molded resin of the eyeglass frame.

15. A process according to claim 14, wherein the step of applying a decorative coating includes steps of electroplating a metallic deposit layer over the entirety of the injection molded resin frame, applying a base coating comprised of a heat-hardened layer of paint over the entirety of said metallic deposit layer, applying a secondary coating layer of a heat-hardened paint over the entirety of said base coating and applying a spotty-formed top coating layer over the entirety of said secondary coating layer.

16. A process according to claim 15, wherein said metallic deposit layer is composed of nickel, the paint of the base and secondary coating layers is composed of a clear color prepared by including a dyestuff in a baking acrylic clear resin, and wherein a dyestuff is used to form the top coating layer that is comprised of a paint prepared by stirring a sublimating dyestuff and pearl powder with alcohol into a gel state.

17. A process according to claim 15, wherein heat-hardening of the paint of the base coating layer is performed for about 10 minutes at 130° C. after having been naturally dried for 10 minutes after being applied; and wherein the paint of said secondary coating layer is heat-hardened for about 20 minutes at 150° C. after having been naturally dried for 10-15 minutes after being applied.

18. A process according to claim 14, wherein the step of applying the decorative coating includes the steps of applying a heat-hardened base and top coating layers, one of which is a spottily applied coating layer of paint and the other of which is applied over the entirety of the eyeglass frame.

19. A process according to claim 18, wherein both the base coating layer and the top coating layer are composed of a baking acrylic paint including a pearl pigment.

20. A process according to claim 18, wherein each of said base and top coating layers is naturally dried for 10-20 minutes and are thereafter hardened by placing the eyeglass frame within a warm-air blowing dryer so as to be subjected to warm air of 150° C. for about 30 minutes.

21. A process according to claim 12, wherein said resin melt is formed from colored polyethylene terephthalate resin pellets admixed with polyarylate resin pellets.

22. Product produced by the process of claim 15.
23. Product produced by the process of claim 16.
24. Product produced by the process of claim 18.

* * * * *